US011258962B2

United States Patent
Jung et al.

(10) Patent No.: US 11,258,962 B2
(45) Date of Patent: Feb. 22, 2022

(54) ELECTRONIC DEVICE, METHOD, AND COMPUTER-READABLE MEDIUM FOR PROVIDING BOKEH EFFECT IN VIDEO

(71) Applicant: Samsung Electronics Co., Ltd., Suwon-si (KR)

(72) Inventors: Yumin Jung, Suwon-si (KR); Junghoon Kim, Suwon-si (KR); Sungho Lee, Suwon-si (KR); Taehwa Hong, Suwon-si (KR); Jiyoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/840,135

(22) Filed: Apr. 3, 2020

(65) Prior Publication Data

US 2020/0322544 A1 Oct. 8, 2020

(30) Foreign Application Priority Data

Apr. 4, 2019 (KR) .................. 10-2019-0039850

(51) Int. Cl.
*H04N 5/262* (2006.01)
*H04N 5/247* (2006.01)
*H04N 5/232* (2006.01)

(52) U.S. Cl.
CPC ..... *H04N 5/2621* (2013.01); *H04N 5/232125* (2018.08); *H04N 5/247* (2013.01)

(58) Field of Classification Search
CPC ............... H04N 5/2621; H04N 5/247; H04N 5/232125; H04N 5/23212; H04N 5/2258
See application file for complete search history.

(56) References Cited

U.S. PATENT DOCUMENTS

| 8,723,912 B2 | 5/2014 | Michrowski et al. |
| 9,405,170 B2 | 8/2016 | Kim et al. |

(Continued)

FOREIGN PATENT DOCUMENTS

| JP | 2013-055489 A | 3/2013 |
| JP | 2018022128 A | 2/2018 |

(Continued)

OTHER PUBLICATIONS

International Search Report dated Jul. 17, 2020 in connection with International Patent Application No. PCT/KR2020/004581, 4 pages.

(Continued)

*Primary Examiner* — Luong T Nguyen

(57) ABSTRACT

An electronic device includes a plurality of cameras, a memory, and at least one processor. The at least one processor is configured to identify a change in a distance between a focused subject and the electronic device within a first frame through at least some of the plurality of cameras while a video with a bokeh effect is acquired. The at least one processor is also configured to provide the bokeh effect of the video within a first background area in a second frame in response to identifying that a difference between a first distance and a second distance is within a criterion range. The at least one processor is further configured to provide the bokeh effect of the video within a second background area identified based on a third distance in the second frame in response to identifying that the difference is out of the criterion range.

20 Claims, 12 Drawing Sheets

(56) References Cited

U.S. PATENT DOCUMENTS

| | | | |
|---|---|---|---|
| 9,716,825 B1* | 7/2017 | Manzari | H04N 5/23222 |
| 10,009,536 B2 | 6/2018 | Manzari et al. | |
| 10,147,216 B1 | 12/2018 | Miao et al. | |
| 10,165,247 B2 | 12/2018 | Lee | |
| 10,178,300 B2 | 1/2019 | Rivard et al. | |
| 2013/0033582 A1* | 2/2013 | Sun | H04N 13/122 |
| | | | 348/47 |
| 2013/0147843 A1* | 6/2013 | Shimizu | H04N 13/122 |
| | | | 345/647 |
| 2015/0043808 A1* | 2/2015 | Takahashi | G06T 5/50 |
| | | | 382/154 |
| 2015/0187083 A1 | 7/2015 | Yoon et al. | |
| 2017/0359506 A1 | 12/2017 | Manzari et al. | |
| 2018/0115700 A1 | 4/2018 | Ryan | |
| 2019/0073749 A1* | 3/2019 | Lin | H04N 5/23229 |
| 2020/0104034 A1 | 4/2020 | Lee et al. | |

FOREIGN PATENT DOCUMENTS

| | | |
|---|---|---|
| KR | 101694421 B1 | 1/2017 |
| KR | 10-2018-0113638 A | 10/2018 |
| KR | 10-2018-0120022 A | 11/2018 |

OTHER PUBLICATIONS

Written Opinion of the International Searching Authority dated Jul. 17, 2020 in connection with International Patent Application No. PCT/KR2020/004581, 6 pages.

* cited by examiner

ELECTRONIC DEVICE, METHOD, AND COMPUTER-READABLE MEDIUM FOR PROVIDING BOKEH EFFECT IN VIDEO

CROSS-REFERENCE TO RELATED APPLICATION

This application is based on and claims priority under 35 U.S.C. 119 to Korean Patent Application No. 10-2019-0039850 filed on Apr. 4, 2019 in the Korean Intellectual Property Office, the disclosure of which is herein incorporated by reference in its entirety.

BACKGROUND

1. Field

The disclosure relates to an electronic device, a method, and a computer-readable medium for providing a bokeh effect in a video.

2. Description of Related Art

Portable electronic devices such as smartphones and tablets may include a plurality of cameras to provide enhanced images (for example, still images and videos).

The above information is presented as background information only to assist with an understanding of the disclosure. No determination has been made, and no assertion is made, as to whether any of the above might be applicable as prior art with regard to the disclosure.

SUMMARY

An electronic device may measure a distance between the electronic device and a focused subject through at least one of a plurality of cameras within the electronic device in order to provide a bokeh effect within an acquired video. The accuracy of the measured distance may vary depending on a change in a state of the focused subject or a change in an environment around the electronic device. Accordingly, a method of providing the bokeh effect that is independent from the change in the state of the focused subject or the change in the environment around the electronic device and has an enhanced quality may be required within the electronic device.

The technical subjects pursued in the disclosure are not limited to the above mentioned technical subjects, and other technical subjects which are not mentioned may be clearly understood through the following descriptions by those skilled in the art of the disclosure.

In accordance with an aspect of the disclosure, an electronic device is provided. The electronic device includes: a plurality of cameras; a memory configured to store instructions; and at least one processor, wherein the at least one processor is configured to, when executing the instructions, identify a change in a distance between a focused subject and the electronic device from a first distance to a second distance within a first frame through at least some of the plurality of cameras while a video with a bokeh effect is acquired using the plurality of cameras, provide the bokeh effect of the video within a first background area identified on the basis of the second distance in a second frame subsequence to the first frame in response to identification that a difference between the first distance and the second distance is within a criterion range, and provide the bokeh effect of the video within a second background area identified on the basis of a third distance between the first distance and the second distance in the second frame in response to identification that the difference is out of the criterion range.

In accordance with another aspect of the disclosure, a method performed by an electronic device with a plurality of cameras is provided. The method includes: identifying a change in a distance between a focused subject and the electronic device from a first distance to a second distance within a first frame through at least some of the plurality of cameras while a video with a bokeh effect is acquired using the plurality of cameras; providing the bokeh effect of the video within a first background area identified on the basis of the second distance in a second frame subsequence to the first frame in response to identification that a difference between the first distance and the second distance is within a criterion range; and providing the bokeh effect of the video within a second background area identified on the basis of a third distance between the first distance and the second distance in the second frame in response to identification that the difference is out of the criterion range.

In accordance with another aspect of the disclosure, a non-transitory computer-readable storage medium for storing one or more programs including instructions is provided. The instructions are configured to cause the electronic device to, when executed by one or more processor of an electronic device with a plurality of cameras, identify a change in a distance between a focused subject and the electronic device from a first distance to a second distance within a first frame through at least some of the plurality of cameras while a video with a bokeh effect is acquired using the plurality of cameras, provide the bokeh effect of the video within a first background area identified on the basis of the second distance in a second frame subsequence to the first frame in response to identification that a difference between the first distance and the second distance is within a criterion range, and provide the bokeh effect of the video within a second background area identified on the basis of a third distance between the first distance and the second distance in the second frame in response to identification that the difference is out of the criterion range.

The electronic device, the method, and the non-transitory computer-readable recording medium according to various embodiments can determine a focus distance independently from a state of a focused subject identified through a camera, thereby providing a bokeh effect with an enhanced quality within an acquired video.

Effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
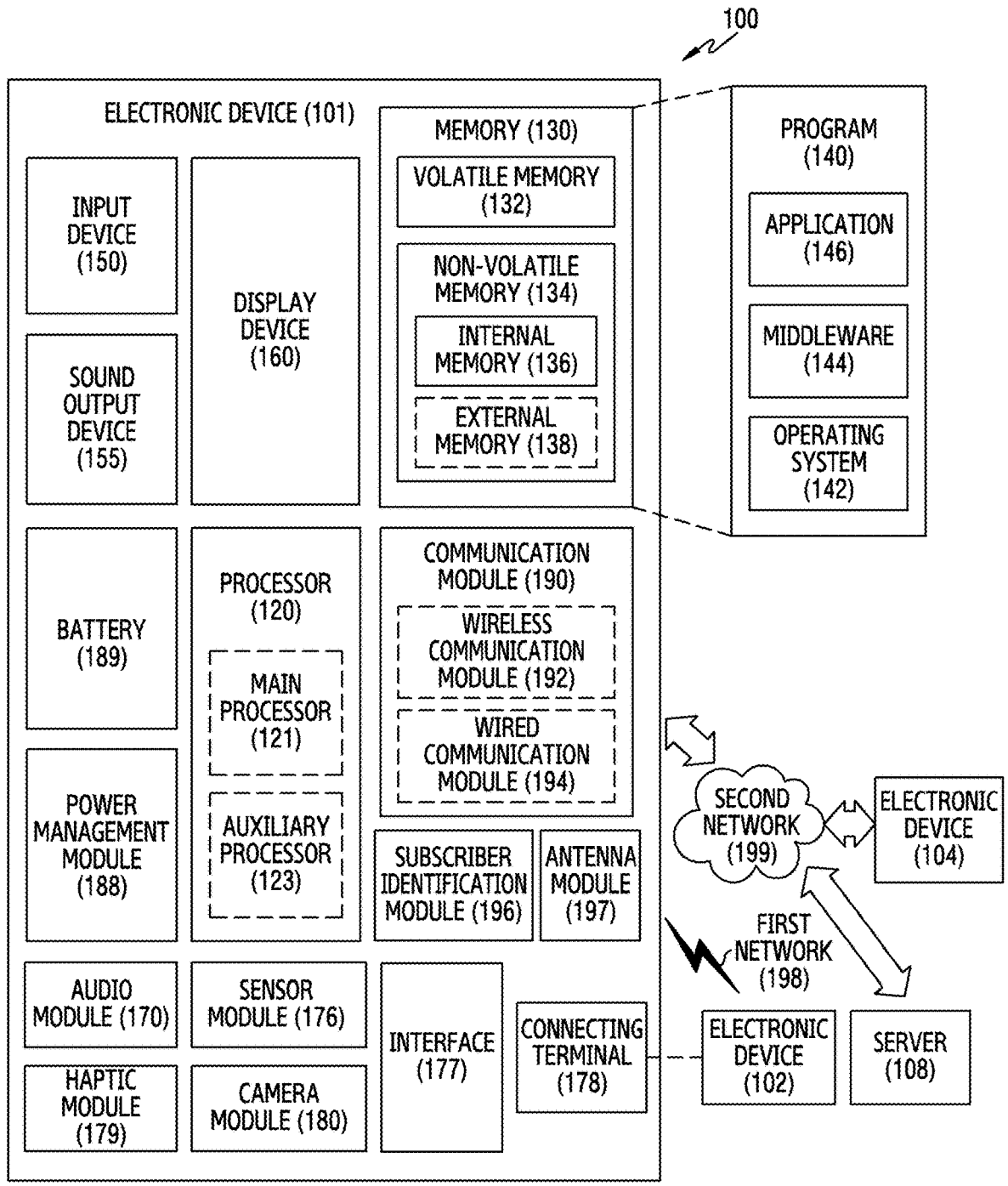
FIG. 1 illustrates a block diagram of an electronic device within a network environment providing a bokeh effect within a video according to various embodiments.

FIG. 1 illustrates a block diagram of an electronic device within a network environment providing a bokeh effect within a video according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
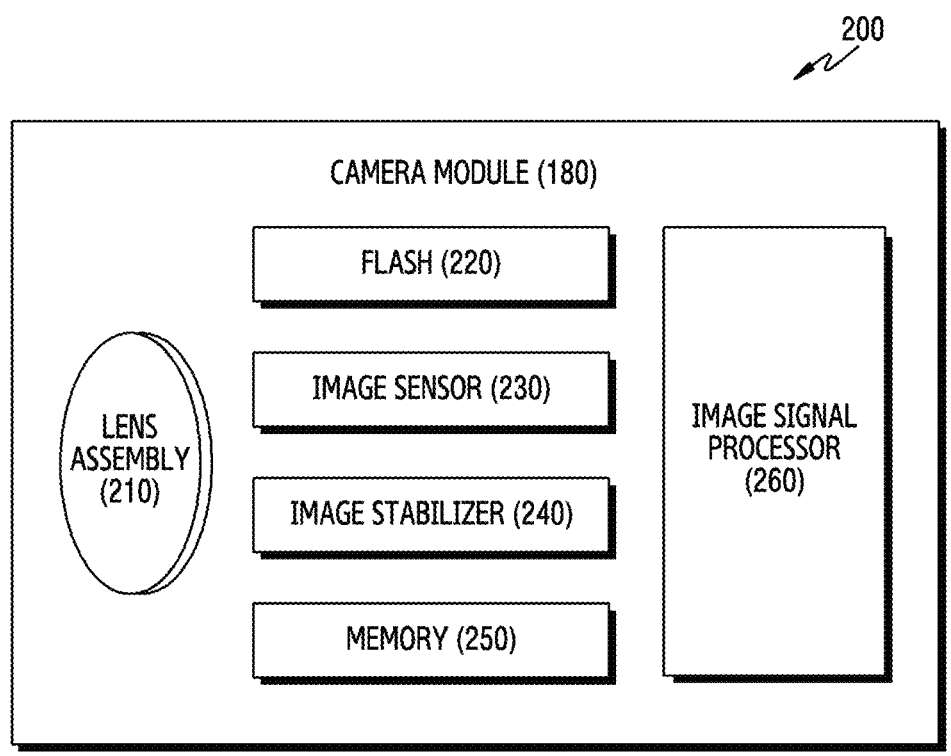
FIG. 2 illustrates a block diagram of a camera module of an electronic device providing a bokeh effect according to various embodiments.

FIG. 2 illustrates a block diagram of a camera module of an electronic device providing a bokeh effect according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
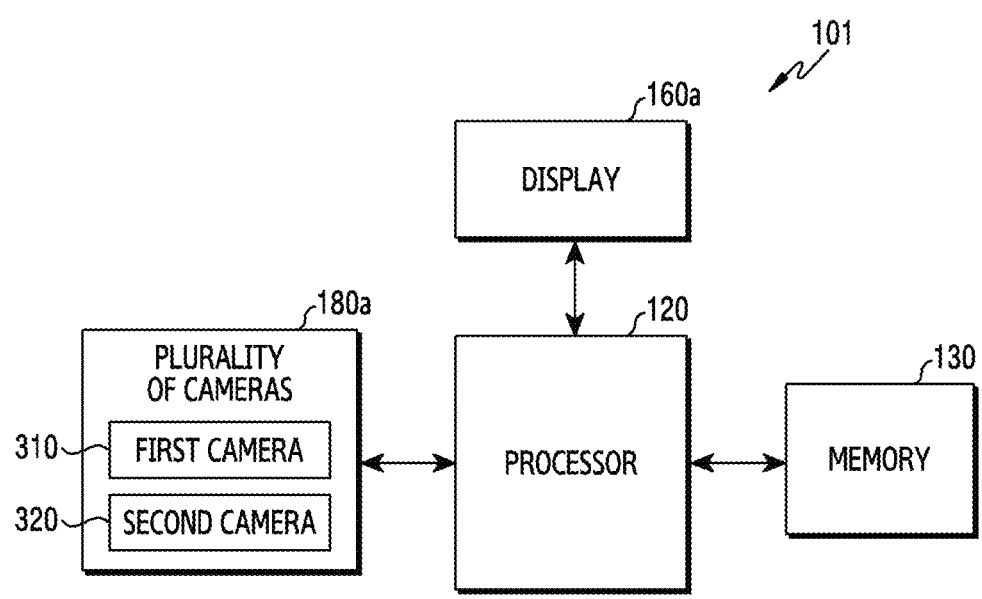
FIG. 3 illustrates a simplified block diagram of an electronic device according to various embodiments.

FIG. 3 illustrates a simplified block diagram of an electronic device according to various embodiments.

Referring to FIG. 3, the electronic device 101 may include a processor 120, a memory 130, a display 160a, and a plurality of cameras 180a.

According to various embodiments, the processor 120 may include the processor 120 illustrated in FIG. 1, the memory 130 may include the memory 130 illustrated in FIG. 1, the display 160a may include the display device 160 illustrated in FIG. 1, and the plurality of cameras 180a may include the camera module 180 illustrated in FIG. 1 or 2.

According to various embodiments, the plurality of cameras 180a may include a first camera 310 and a second camera 320. According to various embodiments, the first camera 310 may be a depth camera. For example, the first camera 310 may be a Time of Flight (TOF) camera. For example, the first camera 310 may include an emitter configured to emit an infrared light and a receiver configured to receive a reflected light of the infrared light. According to various embodiments, the processor 120 operatively connected to the first camera 310 may acquire information on the reflected light of the infrared light emitted from the first camera 310 through the first camera 310. Information on the distance between each of a plurality of subjects in a Field of View (FOV) of the first camera 310 and the electronic device 101 (or the first camera 310) may be acquired on the basis of the acquired information. According to various embodiments, the second camera 320 may be an RGB camera. For example, the second camera 320 may include a receiver configured to receive a visible light.

According to various embodiments, the electronic device 101 may include the plurality of cameras 180a, the memory 130 configured to store instructions, and the processor 120. The processor 120 may be configured to, when executing the instructions, identify a change in a distance between a focused subject and the electronic device from a first distance to a second distance within a first frame through at least some of the plurality of cameras while a video with a bokeh effect is acquired using the plurality of cameras 180a, and identify that a difference between the first distance and the second distance is within a criterion range. The processor 120 may be configured to provide the bokeh effect of the video within a first background area identified on the basis of the second distance in a second frame subsequence to the first frame in response to identification that the difference is within the criterion range. The processor 120 may be configured to provide the bokeh effect of the video within a second background area identified on the basis of a third distance between the first distance and the second distance in the second frame in response to identification that the difference is out of the criterion range According to various embodiments, the processor 120 may be further configured to, when executing the instructions, provide the bokeh effect of the video within a third background identified on the basis of a fourth distance between the second distance and the third distance in a third frame subsequent to the second frame.

According to various embodiments, the processor 120 may be further configured to, when executing the instructions, provide the bokeh effect of the video within a third background area identified on the basis of the first distance in the second frame in response to identification that the difference is out of the criterion range and another criterion range.

According to various embodiments, the plurality of cameras 180a may include an RGB camera (for example, the second camera 320) and a depth camera (for example, the first camera 310).

According to various embodiments, the depth camera may include an emitter configured to emit an infrared light and a receiver configured to receive a reflected light of the infrared light.

According to various embodiments, the processor 120 may be configured to, when executing the instructions, acquire first data on a distance between each of a plurality of subjects including the focused subject in a Field of View (FOV) of the depth camera and the electronic device on the basis of the reflected light. The processor 120 may be configured to, when executing the instructions, acquire third data refined from the first data using second data acquired through the RGB camera in response to identification that some of the plurality of subjects are out of a maximum distance from the electronic device that can be measured using the depth camera on the basis of the first data. The processor 120 may be further configured to, when executing the instructions, identify that the distance between the focused subject and the electronic device is changed from the first distance to the second distance within the first frame on the basis of the third data.

According to various embodiments, the processor 120 may be configured to, when executing the instructions, acquire first data on a distance between each of a plurality of subjects including the focused subject in a Field of View (FOV) of the depth camera and the electronic device on the basis of the reflected light. The processor 120 may be configured to, when executing the instructions, acquire third data refined from the first data using second data acquired through the RGB camera in response to identification that a part of the focused subjects is out of a maximum distance from the electronic device that can be measured using the depth camera. The processor 120 may be further configured to, when executing the instructions, identify that the distance between the focused subject and the electronic device is changed from the first distance to the second distance within the first frame on the basis of the third data.

According to various embodiments, the processor 120 may be configured to, when executing the instructions, acquire the third data refined from the first data by converting some of the first data to data corresponding to data corresponding to a distance between remaining parts of the focused subject and the electronic device, using the second data.

According to various embodiments, the processor 120 may be configured to, when executing the instructions, identify the focused subject among a plurality of subjects in a Field of View (FOV) of the depth camera on the basis of a criterion having a highest priority among a plurality of criteria. A first criterion among the plurality of criteria may be to identify a subject designated by a touch input received through the display among the plurality of subjects as the focused subject. A second criterion among the plurality of criteria may be to identify a subject corresponding to a face among the plurality of subjects as the focused subject. A third criterion among the plurality of criteria may be to identify at least one subject included in an Auto Focus (AF) area among the plurality of subjects and identify a subject the closest to the electronic device among the plurality of subjects as the focused subject. A priority of the first criterion may be higher than a priority of the second criterion and a priority of the third criterion, and the priority of the second criterion may be higher than the priority of the third criterion.

According to various embodiments, the processor 120 may be configured to, when executing the instructions, determine that the focused subject moves out of a maximum distance from the electronic device that is measurable using the depth camera through at least some of the plurality of cameras while the video with the bokeh effect is acquired using the plurality of cameras. The processor 120 may be further configured to, when executing the instructions, gradually remove the bokeh effect from the video on the basis of the determination.

According to various embodiments, the processor 120 may be configured to, when executing the instructions, identify the third distance by adding a criterion distance to the first distance in response to identification that the difference is out of the criterion range. The processor 120 may be configured to, when executing the instructions, provide the bokeh effect of the video within the second background area identified on the basis of the third distance in the second frame and identify the fourth distance by adding the criterion distance to the third distance. The processor 120 may be further configured to, when executing the instructions, provide the bokeh effect of the video within the third background area identified on the basis of the fourth distance in a third frame subsequent to the second frame.

Figure 4:
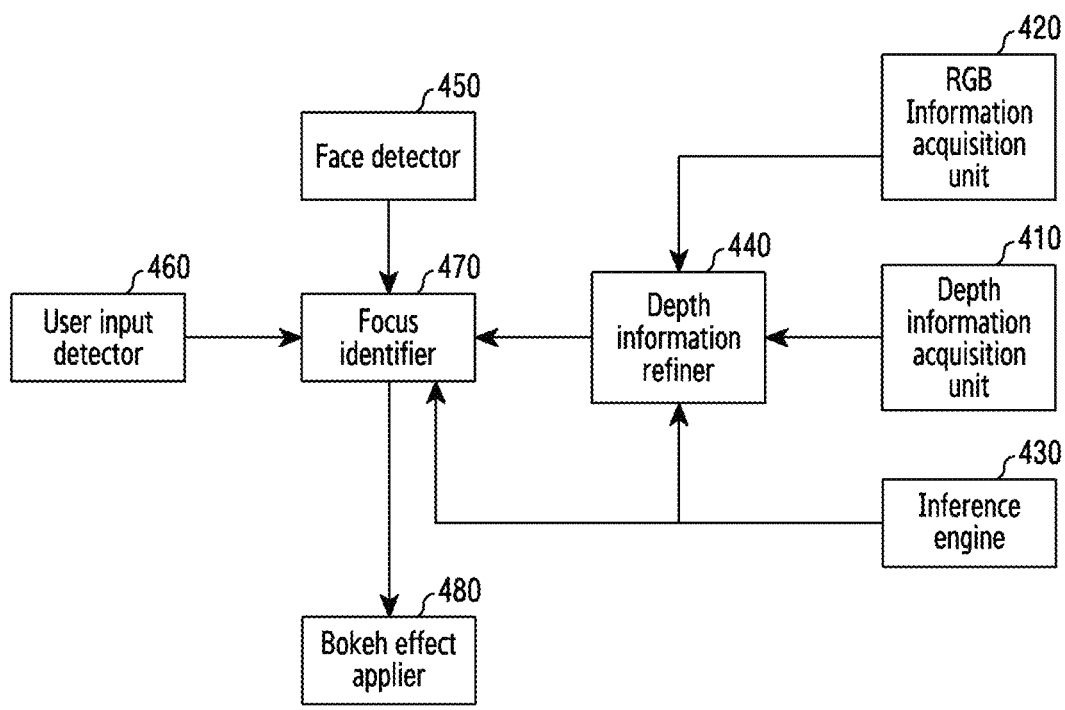
FIG. 4 illustrates an example of execution of a processor of an electronic device according to various embodiments.

FIG. 4 illustrates an example of execution of a processor of an electronic device according to various embodiments. The example may be performed by the processor 120 of FIG. 1 or the processor 120 of FIG. 3.

Referring to FIG. 4, the processor 120 may include a depth information acquisition unit 410, an RGB information acquisition unit 420, an inference engine 430, a depth information refiner 440, a face detector 450, a user input detector 460, a focus identifier 470, and a bokeh effect applier 480. According to various embodiments, the depth information acquisition unit 410, the RGB information acquisition unit 420, the inference engine 430, the depth information refiner 440, the face detector 450, the user input detector 460, the focus identifier 470, and the bokeh effect applier 480 may be implemented as software, hardware, or a combination of software and hardware. For example, the depth information acquisition unit 410, the RGB information acquisition unit 420, the inference engine 430, the depth information refiner 440, the face detector 450, the user input detector 460, the focus identifier 470, and the bokeh effect applier 480 may be implemented by execution of instructions stored in the memory 130, execution of elements included in the electronic device 101, or execution of both instructions stored in the memory 130 and elements included in the electronic device 101.

According to various embodiments, the processor 120 may acquire information on the distance between the electronic device 101 and a plurality of subjects through the depth information acquisition unit 410. For example, the processor 120 may emit a light (for example, an infrared light) through the first camera 310 and receive a reflected light of the emitted light, which is reflected from the plurality of subjects in the FOV of the first camera 310 through the first camera 310. The processor 120 may receive information on the reflected light from the first camera 310. For example, a band of the emitted light and a band of the reflected light may be the same as each other. For example, information on the reflected light may include data on a reception strength of the reflected light. However, this is not limiting. The processor 120 may acquire information on the distance between the electronic device 101 and each of the plurality of subjects on the basis of the information on the reflected light through the depth information acquisition unit 410. According to various embodiments, the information on the distance may be provided to the depth information refiner 440.

According to various embodiments, the processor 120 may acquire information for configuring a video through the RGB information acquisition unit 420. For example, the processor 120 may acquire a plurality of images for configuring a video as the information for configuring the video through the second camera 320 and process the plurality of acquired images, so as to acquire the video. For example, the processor 120 may acquire the plurality of images for configuring the video as the information for configuring the video through each of the first camera 310 and the second camera 320 and combine the plurality of images, so as to acquire the video. However, this is not limiting. According to various embodiments, the information for configuring the video may be provided to the depth information refiner 440.

According to various embodiments, the processor 120 may acquire data for refining the information on the distance and data for identifying a subject to be focused among subjects included in the video through the inference engine 430.

According to various embodiments, the inference engine 430 may include a model for inference. According to various embodiments, the inference engine 430 may train the model on the basis of training data. For example, the inference engine 430 may train the model using the training data in order to provide the result of target data input into the inference engine 430, which has criterion reliability or higher.

According to various embodiments, the inference engine 430 may receive the target data and apply the model to the received target data, so as to acquire or generate the inference result. According to various embodiments, when the model is a trained model, reliability of the inference result may be higher than or equal to criterion reliability. For example, the inference engine 430 may acquire data for refining data on the distance acquired by the depth information acquisition unit 410 using the model on the basis of past operation heuristics of the electronic device 101. In another example, the inference engine 430 may acquire data for identifying the focused subject using the model on the basis of the past operation heuristics of the electronic device 101 including the past use history of the plurality of cameras 180a of the user. The data for refining the information on the distance may be provided to the depth information refiner 440. The data for identifying the focused subject may be provided to the focus identifier 470.

According to various embodiments, the depth information refiner 440 may acquire the information on the distance from the depth information acquisition unit 410. According to various embodiments, the depth information refiner 440 may acquire information for configuring the video from the RGB information acquisition unit 420. According to various embodiments, the depth information refiner 440 may acquire data for refining the information on the distance from the inference engine 430.

According to various embodiments, the information on the distance acquired from the depth information acquisition unit 410 may have a hole. For example, the hole may be a shaded area within an image acquired using the first camera 310. For example, the hole may be a part in which the reflected light has not been received in the information on the distance. For example, the hole may be a part in which a strength of the reflected light is lower than a criterion strength in the information on the distance. For example, the hole may be an area in which a light in a band different from the band of the reflected light is received. For example, the hole may be caused by absorption of the light emitted from the first camera 310 by the subject included in the FOV of the first camera 310. For example, the hole may be caused by the location of the subject included in the FOV of the first camera 310 beyond a maximum distance from the electronic device 101 that is measurable through the first camera 310. However, this is not limiting.

According to various embodiments, the processor 120 may refine the information on the distance through the depth information refiner 440 on the basis of the information for configuring the video. For example, the processor 120 may acquire color data of the hole and in vicinity of the hole from the information for configuring the video through the depth information refiner 440 on the basis of identification that data corresponding to the hole is included in the information on the distance. The processor 120 may refine the information on the distance by compensating for the information on the distance through the depth information refiner 440 on the basis of the color data of the hole and in vicinity of the hole. In another example, the processor 120 may provide information on the state of the hole and in vicinity of the hole to the inference engine 430 through the depth information refiner 440 on the basis of identification that the data corresponding to the hole is included in the information on the distance. Further, the processor 120 may acquire data indicating the state of the hole and in vicinity of the hole through the depth information refiner 440 in response to the information provided to the inference engine 430. The processor 120 may refine the information on the distance through the depth information refiner 440 on the basis of the information acquired from the inference engine 430. However, this is not limiting. According to various embodiments, the refined information on the distance may be provided to the focus identifier 470.

According to various embodiments, the processor 120 may identify whether there is at least one subject including a face among a plurality of subjects included in the FOV of each of the plurality of cameras 180a through the face detector 450 by analyzing the information on the video while the video is acquired. According to various embodiments, the processor 120 may acquire at least one piece of data indicating whether there is at least one subject including a face or data indicating which subject in the plurality of subjects corresponds to the at least one subject including the face when there is at least one subject including the face on the basis of the identification. According to various embodiments, at least one piece of the data indicating whether there is at least one subject including a face or the data indicating which subject in the plurality of subjects corresponds to the at least one subject including the face when there is at least one subject including the face may be provided to the focus identifier 470.

According to various embodiments, the processor 120 may identify whether a user input for designating a focus area (or a focused subject) is received through the user input detector 460 while the video is acquired. For example, the processor 120 may display the video on the display 160a while the video is acquired. The video displayed on the display 160a may include a plurality of visual objects corresponding to the plurality of subjects included in the FOV of each of the plurality of camera 180. The processor 120 may identify that a user input for selecting one (a) of the plurality of visual objects is received as the user input for designating the focus area (or focused subject) through the user input detector 460. According to various embodiments, the processor 120 may display a rectangular indicator to be superimposed on the video displayed on the display 160a in order to inform the user of identification of reception of the user input. However, this is not limiting. According to various embodiments, information on the user input may be provided to the focus identifier 470.

According to various embodiments, the processor 120 may identify the focused subject among the plurality of subjects included in the FOV of the plurality of cameras 180a through the focus identifier 470. According to various embodiments, the focused subject may be a subject required to be tracked in order to provide a bokeh effect in a video acquired by the electronic device 101. According to various embodiments, the distance between the focused subject and the electronic device 101 may be a parameter used to provide the bokeh effect in the video acquired by the electronic device 101. According to various embodiments, the focused subject may be referred to as a target subject or a main subject. However, this is not limiting.

For example, the processor 120 may identify the focused subject among the plurality of subjects on the basis of information provided to the focused identifier 470 from at least one of the face detector 450, the user input detector 460, or the inference engine 430. For example, the processor 120 may identify the focused subject among the plurality of subjects through the focus identifier 470 on the basis of a criterion having the highest priority among a plurality of criteria. For example, a first criterion among the plurality of criteria may be reception of information on the user input from the user input detector 460. For example, a second criterion among the plurality of criteria may be reception of information indicating that there is a subject corresponding to a face among the plurality of subjects from the face detector 450. For example, a third criterion among the plurality of criteria may be identification of at least one subject included in an AF area among the plurality of subjects and identification of a subject which is the closest to the electronic device 101 among the at least one identified subject. For example, when there is no user input or subject corresponding to the face, the AF area may be an area corresponding to a center area of the video displayed on the display 160a among a plurality of areas split from the entire display area of the display 160a. However, this is not limiting. For example, a fourth criterion among the plurality of criteria may be the existence of a focused subject extracted by the inference engine 430 on the basis of the past operation heuristics of the electronic device 101. According to various embodiments, priorities of the plurality of criteria including the first criterion, the second criterion, the third criterion, and the fourth criterion may be determined by a user selection or a configuration of the electronic device 101. For example, the priority of the fourth criterion may be higher than the priority of the first criterion, the priority of the second criterion, and the priority of the third criterion. The priority of the first criterion may be higher than the priority of the second criterion and the priority of the third criterion, and the priority of the second criterion may be higher than the priority of the third criterion. However, this is not limiting. According to various embodiments, information on the identified focused subject may be provided to the bokeh effect applier 480.

According to various embodiments, the processor 120 may provide the bokeh effect in the video acquired through the plurality of camera 180 via the bokeh effect applier 480. For example, the processor 120 may identify a background area of the video to provide the bokeh effect on the basis of the information on the identified focused subject through the bokeh effect applier 480 and provide the bokeh effect within the identified background area. For example, the processor 120 may acquire data on the distance between the focused subject and the electronic device 101 from the information on the identified focused subject. The processor 120 may identify a background area of the video on the basis of the acquired data and provide the bokeh effect within the identified background area. In another example, the processor 120 may identify information on the distance between the focused subject and the electronic device 101, used to provide the bokeh effect in a frame right before the current frame, through the bokeh effect applier 480 on the basis of identification that a change in the distance between the focused subject and the electronic device 101 is out of a criterion range from the information on the identified focused subject. The processor 120 may provide the bokeh effect within the identified background area of the video through the bokeh effect applier 480 on the basis of the identified information. In another example, the processor 120 may identify that the focused subject is located beyond the maximum distance from the electronic device 101, which can be measured using the first camera 310, through the bokeh effect applier 480 and gradually remove the bokeh effect, which is being provided, from the video on the basis of the identification.

An example for applying the bokeh effect according to various embodiments will be described below with reference to FIGS. 5 to 9B.

Figure 5:
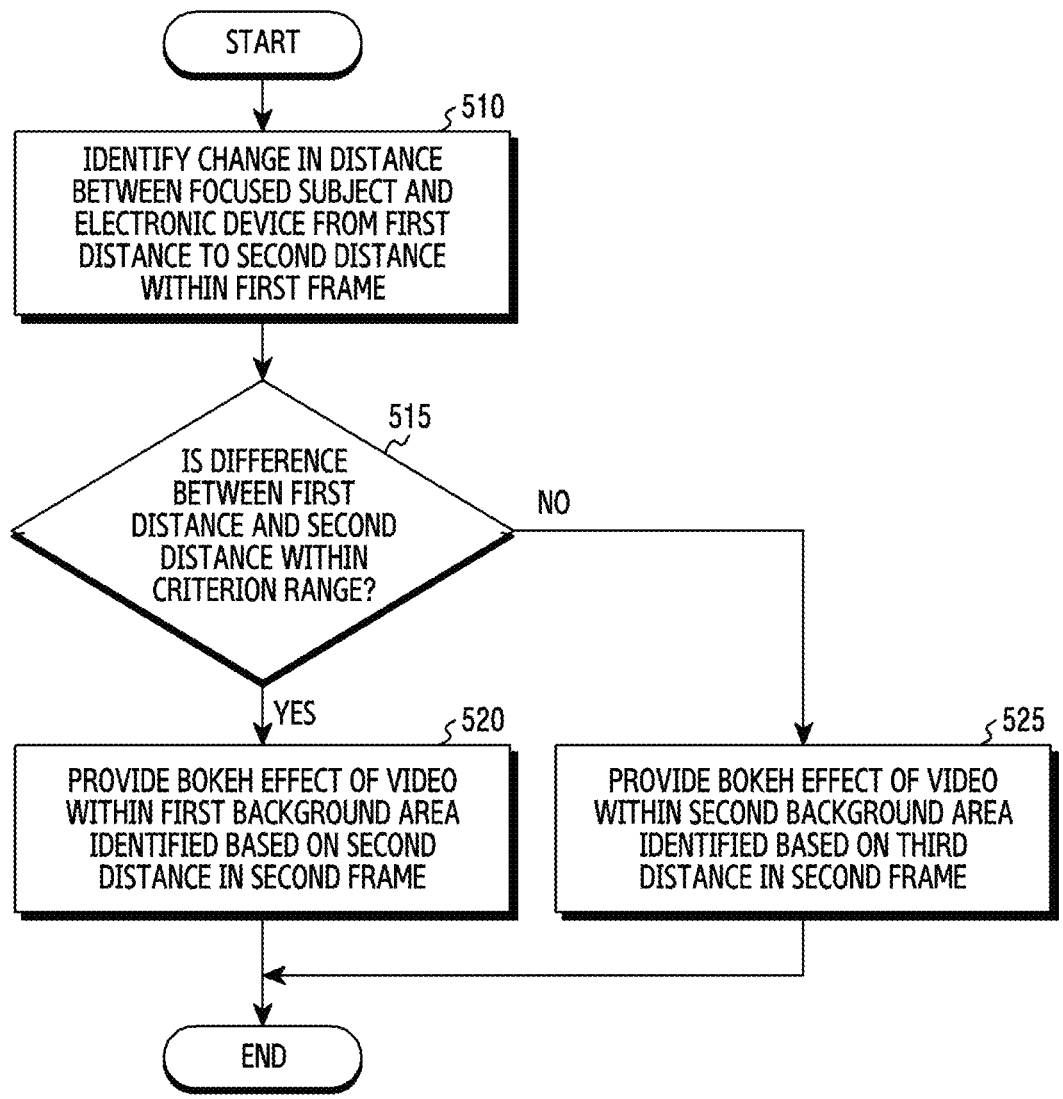
FIG. 5 is a flowchart illustrating a method of providing a bokeh effect according to various embodiments.

FIG. 5 is a flowchart illustrating a method of providing a bokeh effect according to various embodiments. The method may be performed by the electronic device 101 illustrated in FIGS. 1 and 3 or the processor 120 of the electronic device 101.

Referring to FIG. 5, in operation 510, the processor 120 may identify a change in the distance between the focused subject and the electronic device 101 from a first distance to a second distance in the first frame. For example, the processor 120 may acquire a video with the bokeh effect through the plurality of cameras 180*a*. For example, the bokeh effect within the first frame may be provided within the identified background area of the video on the basis of the first distance. The processor 120 may identify the change in the distance between the focused subject and the electronic device from the first distance to the second distance in the first frame through at least some of the plurality of cameras 180*a* (for example, the first camera 310 and/or the second camera 320) while the bokeh effect is provided.

In operation 515, the processor 120 may identify whether a difference between the first distance and the second distance is within a criterion range. According to various embodiments, the criterion range may be configured within the electronic device 101 in order to provide a bokeh effect having an enhanced quality within a video acquired using the plurality of cameras 180*a*. For example, the distance between the focused subject and the electronic device 101 identified by the processor 120 may be sharply changed by a change in the state of the focused subject (for example, movement at a high speed or a change in a color of the subject) or a change in a surrounding environment of the electronic device 101. When the electronic device provides the bokeh effect within the identified area of the video on the basis of the sharply changed distance, the quality of the video acquired by the electronic device may deteriorate due to sharp scene change. In order to prevent deterioration of the quality, the electronic device 101 according to various embodiments may determine a distance to be used to provide the bokeh effect on the basis of the criterion range and provide the bokeh effect within a second frame after the first frame on the basis of the determined distance. The second frame may be a frame subsequent to the first frame. According to various embodiments, when it is identified that the difference between the first distance and the second distance is within the criterion range, the processor 120 may perform operation 520. Otherwise, the processor 120 may perform operation 525.

In operation 520, the processor 120 may provide the bokeh effect of the video within a first background area identified on the basis of the second distance in the second frame on the basis of the identification that the difference between the first distance and the second distance is within the criterion range. The difference between the first distance and the second distance that is within the criterion range may mean no sharp movement of the focused subject. In this case, the processor 120 may provide the bokeh effect in the second frame within the first background area identified on the basis of the second distance. The difference between the first distance and the second distance that is within the criterion range may mean that the quality of the video does not deteriorate even though the bokeh effect is provided on the basis of the changed distance between the focused subject and the electronic device 101. In this case, the processor 120 may provide the bokeh effect in the second frame within the first background area of the video identified on the basis of the second distance that is the changed distance.

In operation 525, the processor 120 may provide the bokeh effect of the video in a second background area identified on the basis of a third distance within the second frame on the basis of the identification that the difference between the first distance and the second distance is out of the criterion range. For example, the processor 120 may identify the third distance by adding a criterion distance to the first criterion used to provide the bokeh effect and provide the bokeh effect of the video within the second background area identified on the basis of the third distance in operation 510. For example, the processor 120 may provide the bokeh effect in the second frame within the second background area identified on the basis of the third distance independently from the second distance that is the changed distance between the focused subject and the electronic device 101. For example, the processor 120 may provide the bokeh effect in the second frame within the second background area identified on the basis of the third distance without using the second distance that is the changed distance between the focused subject and the electronic device 101. For example, the processor 120 may provide the bokeh effect in the second frame within the second background area identified on the basis of the third distance regardless of the second distance that is the changed distance between the focused subject and the electronic device 101.

As described above, the electronic device 101 according to various embodiments may identify the distance between the focused subject and the electronic device 101 while the video with the bokeh effect is acquired through the plurality of cameras 180*a*. When the change in the distance is out of the criterion range, the electronic device 101 may forgo, bypass, or delay provision of the bokeh effect on the basis of the distance between the focused subject and the electronic device 101 and provide the bokeh effect on the basis of another distance distinguished from the changed distance. The electronic device 101 according to various embodiments may acquire the video with the bokeh effect having the enhanced quality through such operation.

Figure 6:
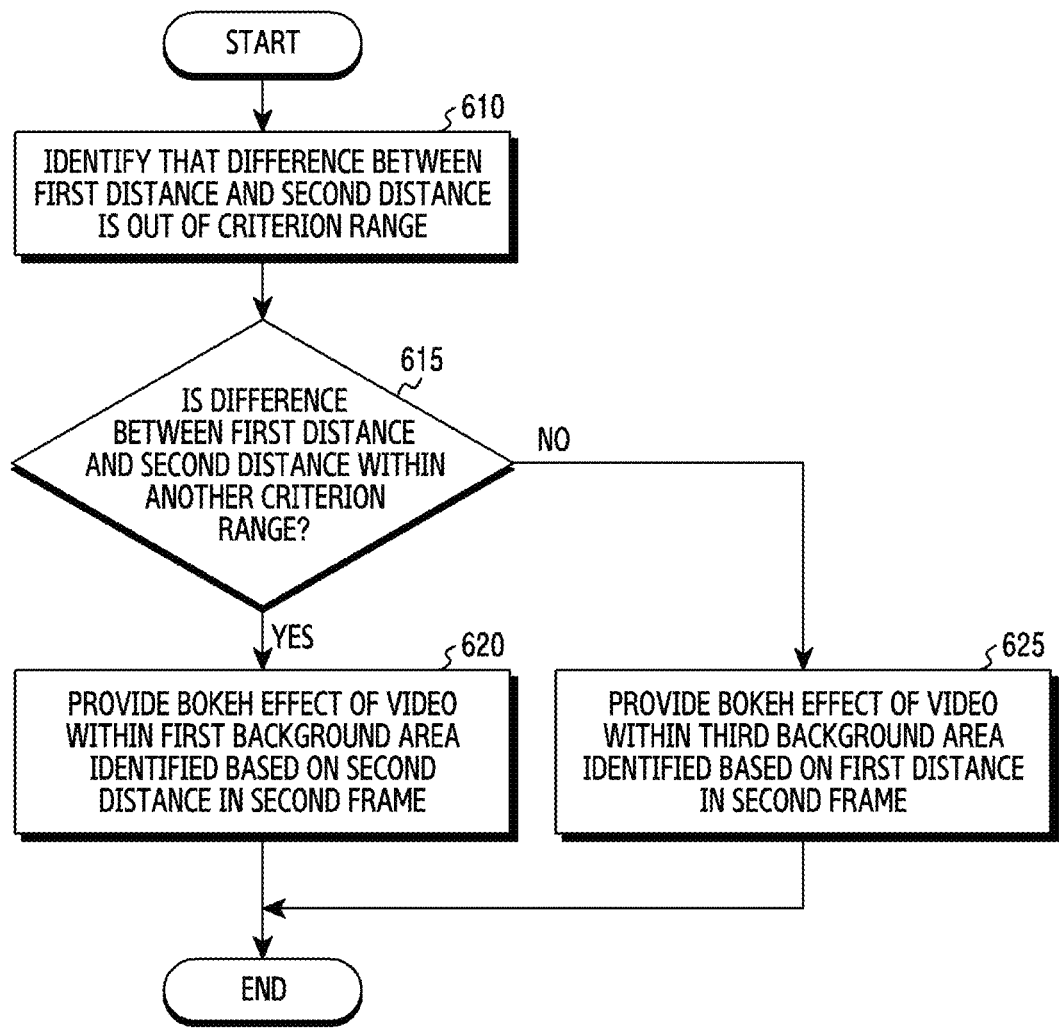
FIG. 6 is a flowchart illustrating a method of providing a bokeh effect on the basis of a reference range and another reference range according to various embodiments.

FIG. 6 is a flowchart illustrating a method of providing a bokeh effect on the basis of a criterion range and another criterion range according to various embodiments. The method may be performed by the electronic device 101 illustrated in FIGS. 1 and 3 or the processor 120 of the electronic device 101.

Operations 610 to 625 of FIG. 6 may be related to operation 525 of FIG. 5.

Referring to FIG. 6, in operation 610, the processor 120 may identify that the difference between the first distance and the second distance may be out of the criterion range. The first distance, the second distance, and the criterion range of FIG. 6 may correspond to the first distance, the second distance, and the criterion range defined through the description of FIG. 5, respectively.

In operation 615, the processor 120 may identify whether the difference between the first distance and the second distance is within another criterion range on the basis of the identification that the difference between the first distance and the second distance is out of the criterion range. According to various embodiments, another criterion range may be a parameter defined to prevent an unnatural scene change provided by the video although the difference between the first distance and the second distance does not deteriorate the quality of the video. According to various embodiments, values included in another criterion range may be some of the values included in the criterion range. For example, the different that is out of the criterion range and is within another criterion range may mean that a value indicating the different is one of values from a maximum value within the criterion range to a first value out of the criterion range. For example, the different that is out of the criterion range and another criterion range may mean that a value indicating the different is one of values from the first value out of the criterion range and a maximum value out of the criterion range. However, this is not limiting. According to various embodiments, when the difference between the first distance and the second distance is within another criterion range, the processor 120 may perform operation 620. Otherwise, the processor 120 may perform operation 625.

In operation 620, the processor 120 may provide the bokeh effect of the video within the second background area identified on the basis of the third distance within the second frame on the basis of the identification that the difference between the first distance and the second distance is out of the criterion range and within another criterion range. For example, the third criterion may be a value between the first distance and the second distance to a natural change of the scene of the video. For example, the third distance may be defined to gradually perform the video scene change until the bokeh is provided within the area of the video identified on the basis of the second distance. For example, the third distance may be determined by adding a criterion distance (or a unit distance) to the first distance. However, this is not limiting.

In operation 625, the processor 120 may provide the bokeh effect of the video within a third background area identified on the basis of the first distance within the second frame on the basis of the identification that the difference between the first distance and the second distance is out of the criterion range and another criterion range. For example, since the difference between the first distance and the second distance that is out of the criterion range and another criterion range means that information on the distance between the focused subject identified through at least some of the plurality of cameras 180a and the electronic device 101 has an error due to some factors, the processor 120 may provide the bokeh effect in the second frame within the third background area identified on the basis of the first distance on the basis of the identification that the difference between the first distance and the second distance is out of the criterion range and another criterion range. However, this is not limiting.

As described above, the electronic device 101 according to various embodiments may identify the distance between the focused subject and the electronic device 101 while the video with the bokeh effect is acquired through the plurality of cameras 180a. When it is estimated that a distance measured through at least some of the plurality of cameras 180a has an error and the change in the distance is sharp, the electronic device 101 may maintain the distance used to provide the bokeh effect as the distance used to currently provide the bokeh effect. The electronic device 101 according to various embodiments may acquire the video with the bokeh effect having the enhanced quality through such operation.

Figure 7A:
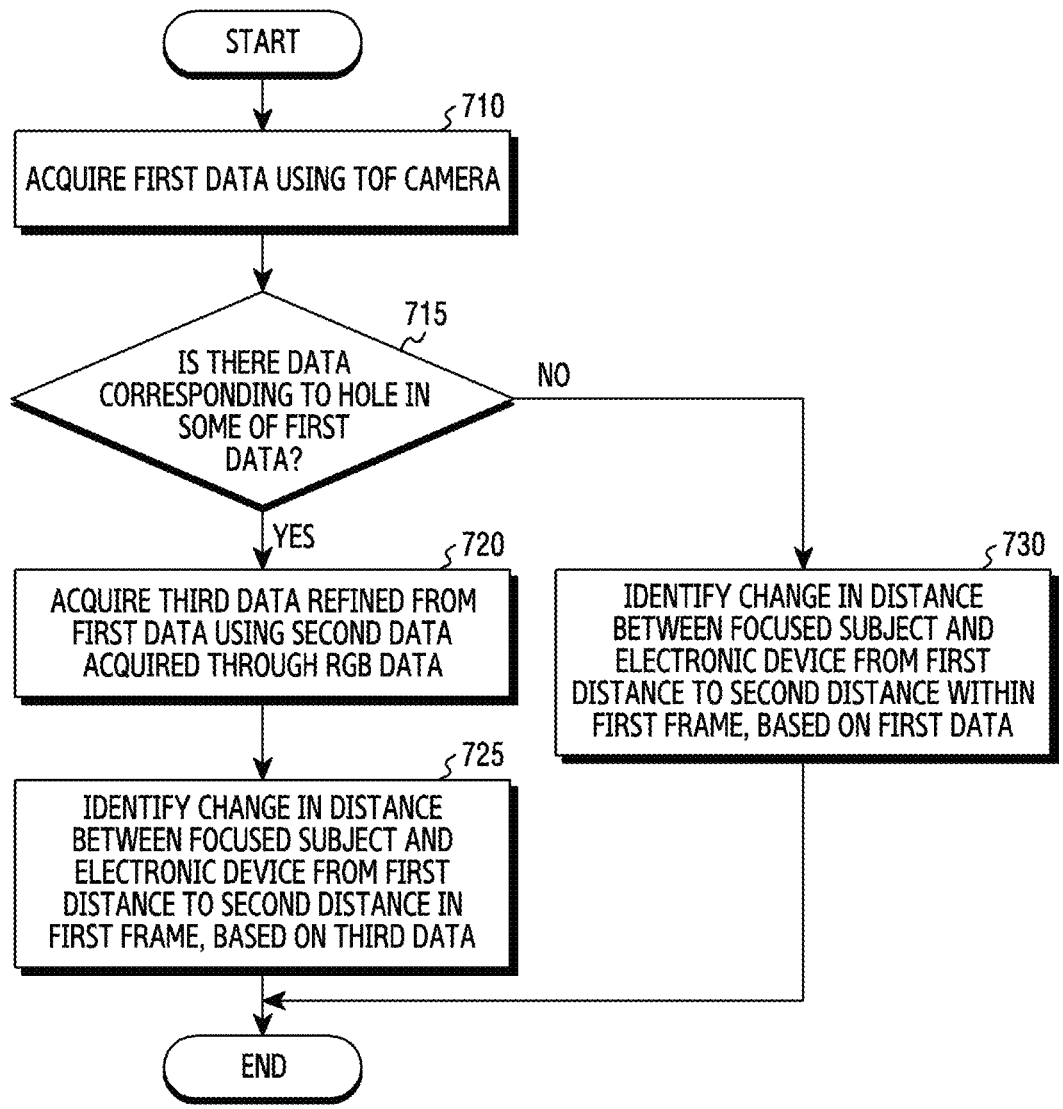
FIG. 7A is a flowchart illustrating a method of identifying a change in the distance between a focused subject and an electronic device according to various embodiments.

FIG. 7A is a flowchart illustrating a method of identifying a change in the distance between the focused subject and the electronic device according to various embodiments. The method may be performed by the electronic device 101 illustrated in FIGS. 1 and 3 or the processor 120 of the electronic device 101.

Figure 7B:
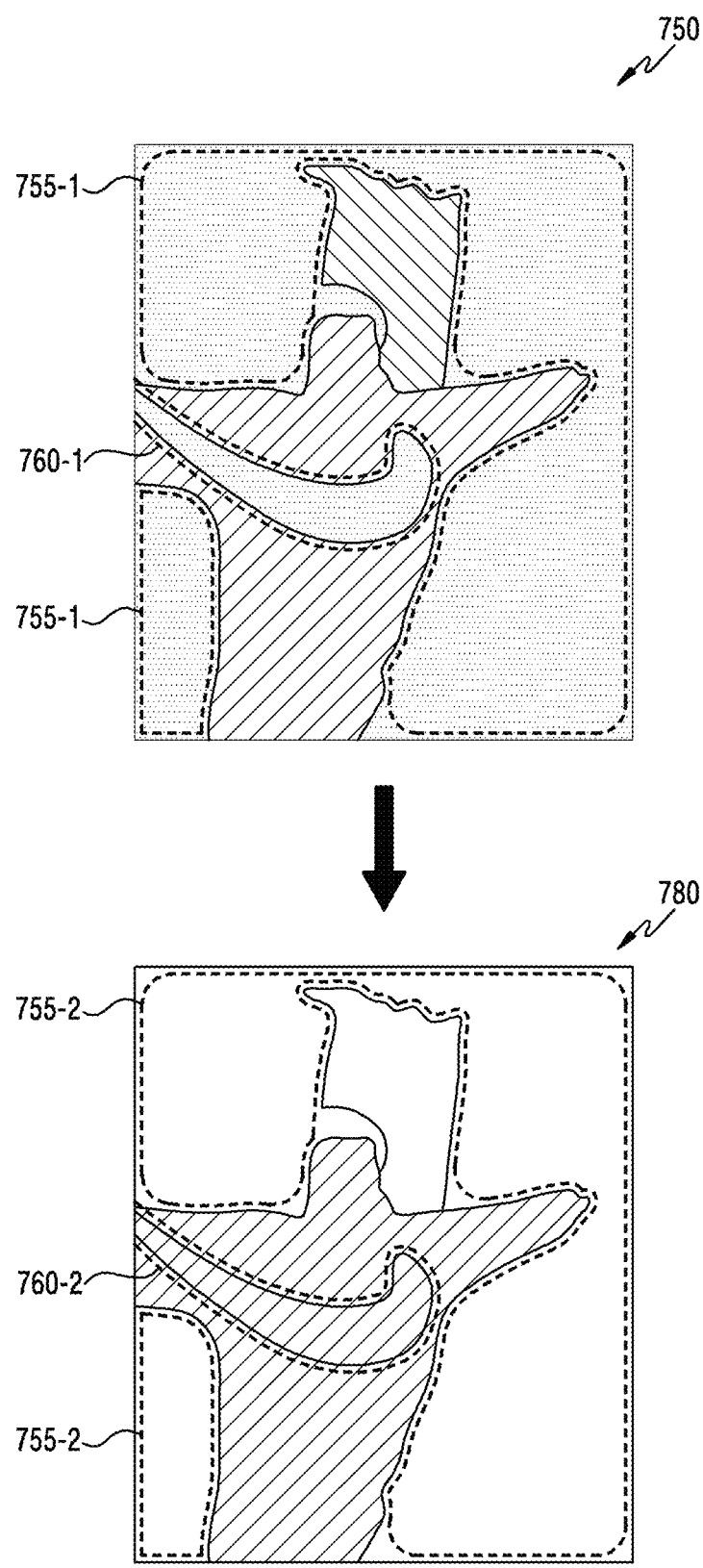
FIG. 7B illustrates an example of third data refined from first data according to various embodiments.

FIG. 7B illustrates an example of third data refined from first data according to various embodiments.

Operations 710 to 730 of FIG. 7A may be related to operation 510 of FIG. 5.

Referring to FIG. 7A, in operation 710, the processor 120 may acquire first data through a TOF camera which is the first camera 310. For example, the TOF camera may include an emitter configured to emit an infrared light and a receiver configured to receive a reflected light of the infrared light. According to various embodiments, the processor 120 may acquire the first data on the distance between each of a plurality of subjects in the FOV of the TOF camera and the electronic device 101 on the basis of the reflected light.

In operation 715, the processor 120 may identify whether there is data corresponding to the hole defined through the description of FIG. 4 in some of the first data. For example, when some of the plurality of subjects are out of the maximum distance (for example, effective distance) from the electronic device 101 that can be measured using the TOF camera, the first data may include data corresponding to the hole. In another example, when a part of the focused subject has a color that absorbs the infrared light emitted from the TOF camera, the first data may include the data corresponding to the hole in an area corresponding to the focused subject.

For example, referring to FIG. 7B, an image 750 indicating the first data acquired using the TOF camera may include an area 755-1 corresponding to the hole and an area 760-1 corresponding to the hole. For example, the area 755-1 may be an area generated when the subjects are out of the maximum distance from the electronic device 101 that can be measured using the TOF camera. For example, the area 760-1 may be an area generated when the part of the focused subject has a color that absorbs the infrared light emitted from the TOF camera. However, this is not limiting. According to various embodiments, when there is data corresponding to the hole in some of the first data, the processor 120 may perform operation 720. Otherwise, the processor 120 may perform operation 730.

In operation 720, the processor 120 may acquire third data refined (or updated) from the first data using the second data acquired through the RGB camera, which is the second camera 320, on the basis of the identification that there is the data corresponding to the hole in some of the first data. For example, the processor 120 may acquire information on pixels corresponding to the hole and the vicinity of the hole through the second data and acquire the third data refined from the first data on the basis of the information on the pixels.

For example, referring to FIG. 7B, the processor 120 may compensate for the area 755-1 of the image 750 indicating the first data acquired through the TOF camera through the second data and compensate for the area 760-1 of the image 750 indicating the first data acquired through the TOF camera through the second data. For example, the processor 120 may acquire an image 780 indicating the third data refined from the first data on the basis of the compensation.

For example, the third data acquired by the processor 120 may include the image 780 having an area 755-2 refined or converted from the area 755-1 and an area 760-2 refined or converted from the area 760-1.

According to embodiments, the processor 120 may acquire the third data refined from the first data further using data acquired from the inference engine 430.

In operation 725, the processor 120 may identify within the first frame a change in the distance between the focused subject and the electronic device 101 from the first distance to the second distance on the basis of the third data.

In operation 730, the processor 120 may identify a change of the distance between the focused subject and the electronic device 101 from the first distance to the second distance on the first data in the first frame in response to the identification that there is no data corresponding to the hole in some of the first data.

As described above, the electronic device 101 according to various embodiments may measure the distance between each of the subjects around the electronic device 101 and the electronic device 101 using not only the first data acquired through the TOF camera but also other information (for example, the second data acquired by the RGB camera and/or the data acquired by the inference engine 430). The electronic device 101 according to various embodiments may acquire enhanced depth information by allocating distance information to all pixels for providing the video through such measurement.

Figure 8A:
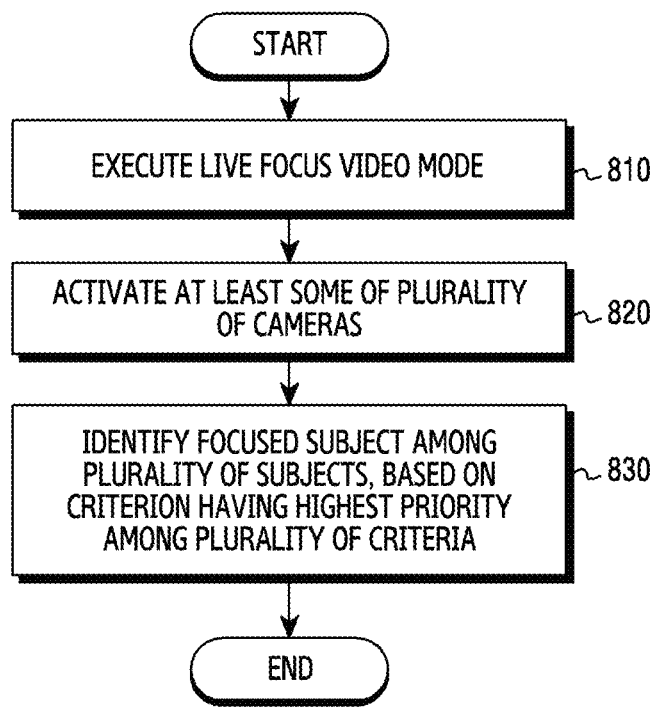
FIG. 8A is a flowchart illustrating a method of identifying a focused subject according to various embodiments.

FIG. 8A is a flowchart illustrating a method of identifying the focused subject according to various embodiments. The method may be performed by the electronic device 101 illustrated in FIGS. 1 and 3 or the processor 120 of the electronic device 101.

Figure 8B:
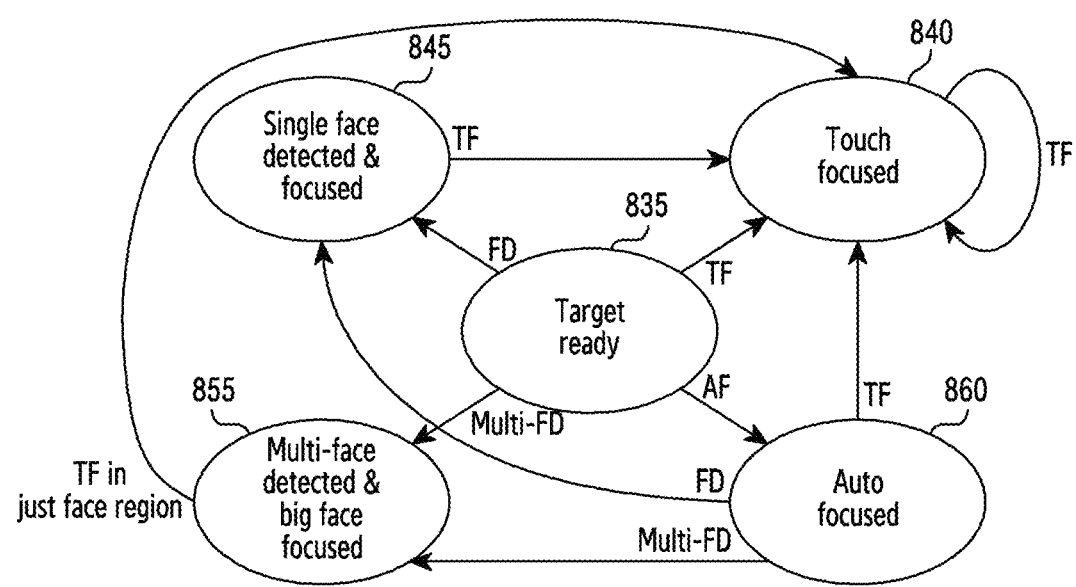
FIG. 8B illustrates an example of references defined to identify the focused subject according to various embodiments.

FIG. 8B illustrates an example of criteria defined to identify the focused subject according to various embodiments.

Operations 810 to 830 of FIG. 8A may be performed within the electronic device 101 to identify the focused subject described with reference to FIG. 5.

Referring to FIG. 8A, in operation 810, the processor 120 may execute a live focus video mode. For example, the live focus video mode may be a mode for providing, while the video is acquired using the plurality of cameras 180, the bokeh effect within the acquired video. For example, the processor 120 may display a plurality of visual objects indicating a plurality of shooting modes on the display 160*a* along with a preview image within a user interface of a camera application. The processor 120 may execute the live focus video mode in response to reception of a user input for selecting a visual object indicating the live focus video mode among the plurality of visual objects. According to various embodiments, the user input may be at least one of a single tap input, a double tap input, a force touch input having a press strength higher than or equal to a criterion strength, or a drag input. However, this is not limiting.

In operation 820, the processor 120 may activate at least some of the plurality of cameras 180*a* in response to execution of the live focus video mode. For example, when the live focus video mode is executed by switching from another shooting mode, the processor 120 may maintain the active state of the camera used for the other shooting mode and additionally switch the state of the camera used for the live focus video mode to the active state. In another example, when all of the plurality of cameras 180*a* are deactivated, the processor 120 may activate all of the plurality of cameras 180*a* in response to execution of the live focus video mode. However, this is not limiting.

In operation 830, the processor 120 may identify the focused subject among the plurality of subjects on the basis of a criterion having the highest priority among a plurality of criteria through at least some activated cameras of the plurality of cameras 180*a*. For example, the first data or the third data described through FIGS. 7A and 7B may be used to identify the focused subject.

For example, the plurality of criteria may be the criteria defined through the description of FIG. 4. For example, referring to FIG. 8B, the processor 120 may acquire information on the distance between each of the subjects and the electronic device 101 through at least some activated cameras of the plurality of cameras 180*a*. The electronic device 101 may be in a state 835 while the information is acquired. The processor 120 may receive a touch input for designating a focus area while the electronic device 101 is in the state 835. The processor 120 may switch the electronic device 101 from the state 835 to a state 840 in response to reception of the touch input. In the state 840, the processor 120 may identify a subject within the focus area designated by the touch input as the focused subject. In the state 840, the processor 120 may receive another touch input distinguished from the touch input. The processor 120 may change the focused subject to another subject included within the focus area designated by the other touch input in response to reception of the other touch input.

In the state 835, the processor 120 may identify one subject corresponding to a face on the basis of an image acquired through at least some of the plurality of cameras 180*a* in the state in which touch input for designating the focus input is not received. The processor 120 may switch the state of the electronic device 101 from the state 835 to a state 845 in response to the identification. The processor 120 may identify the subject corresponding to the face as the focused subject. The processor 120 may switch the state 845 to the state 840 in response to reception of the touch input for designating the focus area in the state 845. This is because the priority of the state 845 is lower than the priority of the state 840.

In the state 835, the processor 120 may identify a plurality of subjects corresponding to faces on the basis of an image acquired through at least some of the plurality of cameras 180*a* in the state in which the touch input for designating the focus input is not received. The processor 120 may switch the state of the electronic device 101 from the state 835 to a state 855 in response to the identification. The processor 120 may identify a subject corresponding to a face having the largest size among the plurality of subjects corresponding to the face as the focused subject in the state 855. In state 855, the processor 120 may switch the state 855 to the state 840 in response to reception of the touch input for designating the focus area. This is because the priority of the state 855 is lower than the priority of the state 840. According to various embodiments, the touch input received in the state 855 may be an input for selecting one of the plurality of faces. However, this is not limiting.

In the state 835, the processor 120 may switch the state 835 to a state 860 on the basis of identification that the touch input for designating the focus input is not received and no face is detected within the acquired image. In the state 860, the processor 120 may identify a center area among the plurality of areas split from the video displayed on the display 160*a* as an Auto Focus (AF) area. In state 860, the processor 120 may identify a subject which is the closest to the electronic device 101, among at least one subject included in the AF area as the focused subject. The processor 120 may switch the state 860 to the state 840 in response to reception of the touch input for designating the focus area. This is because the priority of the state 860 is lower than the priority of the state 840. The processor 120 may switch the state 860 to the state 845 or the state 855 in response to detection of the face in the image acquired in the state 860. This is because the priority of the state 860 may be lower than the priority of the state 845 and the state 855.

As described above, while the video is acquired through at least some of the plurality of cameras 180*a*, the electronic device 101 according to various embodiments may identify the focused subject according to a rule in order to apply the bokeh effect within the acquired video. The electronic device 101 according to various embodiments may search for and track the focused subject on the basis of the identification, so as to acquire a video having an enhanced quality bokeh effect.

Figure 9A:
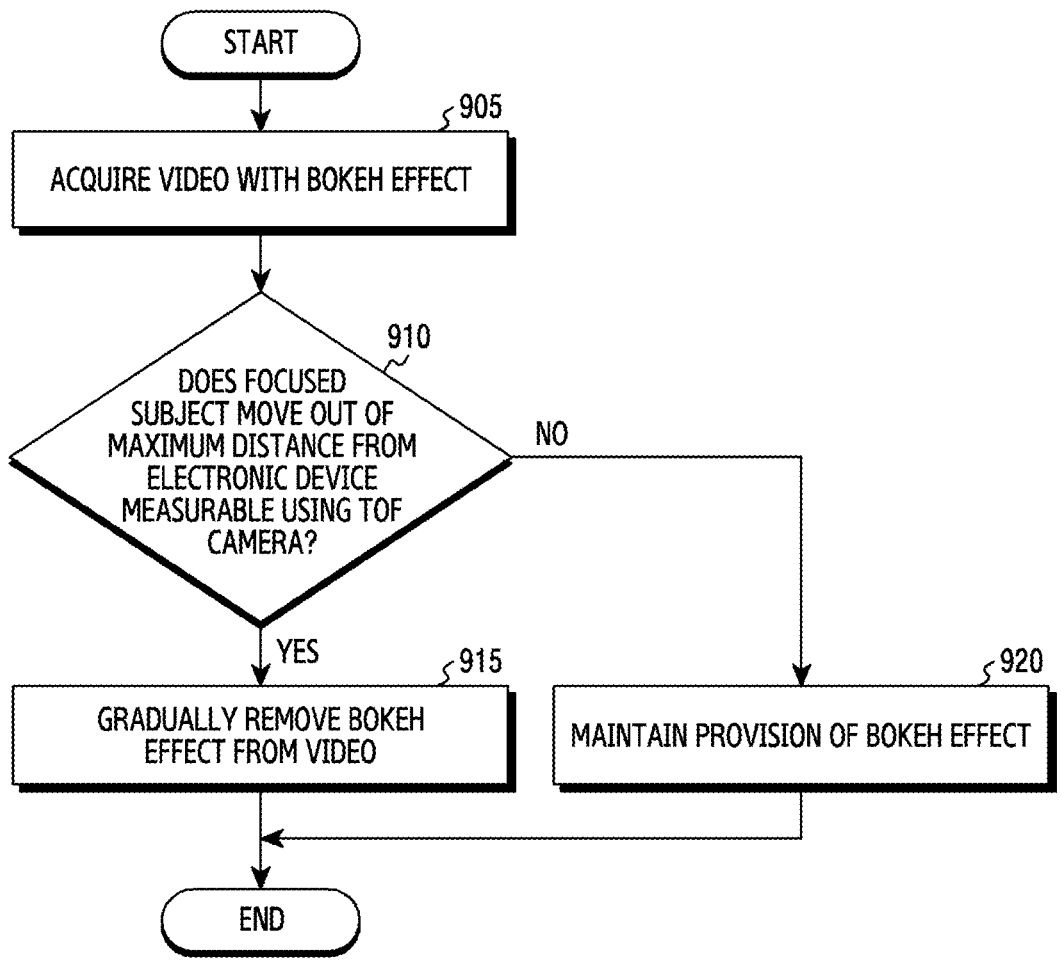
FIG. 9A is a flowchart illustrating a method of gradually removing a bokeh effect from an acquired video according to various embodiments.

FIG. 9A is a flowchart illustrating a method of gradually removing the bokeh effect from the acquired video according to various embodiments. The method may be performed by the electronic device 101 illustrated in FIGS. 1 and 3 or the processor 120 of the electronic device 101.

Figure 9B:
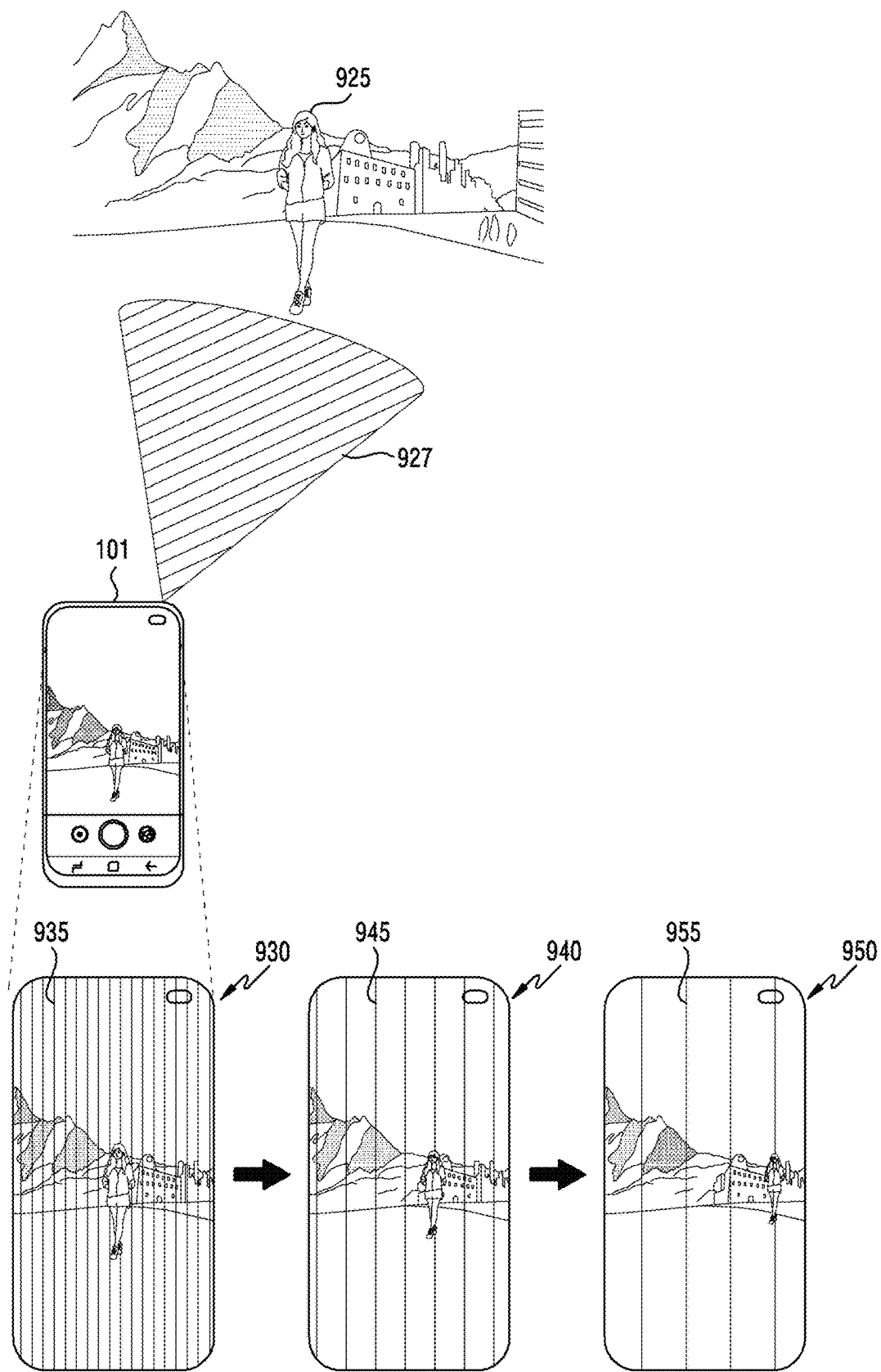
FIG. 9B illustrates an example of the gradually removed bokeh effect according to various embodiments.

FIG. 9B illustrates an example of the gradually removed bokeh effect according to various embodiments.

In operation 905, the processor 120 may acquire the video with the bokeh effect through the plurality of cameras 180*a*. For example, the processor 120 may acquire the video with the bokeh effect through the plurality of cameras 180*a* as in operation 510, operation 520, or operation 525 of FIG. 5.

In operation 910, the processor 120 may identify whether the focused subject moves out of the maximum distance from the electronic device 101 that can be measured using the first camera 310, which is the TOF camera, among the plurality of cameras 180*a* while the video with the bokeh effect is acquired using the plurality of cameras 180*a*. For example, the processor 120 may identify whether the focused subject moves out of the maximum distance on the basis of the first data or the third data refined from the first data. According to various embodiments, when the focused subject moves out of the maximum distance, the processor 120 may perform operation 915. Otherwise, the processor 120 may perform operation 920.

In operation 920, the processor 120 may gradually remove the bokeh effect from the video acquired using the plurality of cameras 180*a* on the basis of identification that the focused subjects move out of the maximum distance. Since the focused subject moving out of the maximum distance may mean that the distance between the focused subject and the electronic device 101 cannot be measured using the TOF camera which is the first camera 310, the processor 120 may gradually remove the bokeh effect from the video. For example, when the bokeh effect is removed from the video at once (immediately) instead of being gradually removed, the video may have a sharp scene change. In order to prevent the sharp scene change, the processor 120 according to various embodiments may gradually remove the bokeh effect from the video on the basis of identification that the focused subject moves out of the maximum distance.

For example, referring to FIG. 9B, a focused subject 925 of a video acquired using at least some of the plurality of cameras 180*a* may be located out of a maximum distance 927 from the electronic device 101 that can be measured using the TOF camera, which is the first camera 310. For example, the processor 120 may identify that the subject 925 is located out of the maximum distance 927 while a bokeh effect 935 at a $K^{th}$ level is provided within the video acquired using at least some of the plurality of cameras 180*a* as in a state 930. The processor 120 may switch the state 930 to a state 940 on the basis of the identification. For example, the processor 120 may provide a bokeh effect 945 at an $L^{th}$ level that is lower than the $K^{th}$ level in the state 940 switched from the state 930 by removing some of the bokeh effect 935 at the $K^{th}$ level provided in the state 930 from the video acquired using at least some of the plurality of cameras 180*a*. After providing the bokeh effect 945 at the $L^{th}$ level for a predetermined time, the processor 120 may switch the state 940 to a state 950. For example, the processor 120 may provide a bokeh effect 955 at an $M^{th}$ level that is lower than the $L^{th}$ level in the state 950 switched from the state 940 by removing some of the bokeh effect 955 at the $L^{th}$ level provided in the state 940 from the video acquired using at least some of the plurality of cameras 180*a*. The processor 120 of the electronic device 101 according to various embodiments may switch the state 930 to the state 940 and switch the state 940 to the state 950 on the basis of identification that the subject 925 is located out of the maximum distance 927, so as to gradually remove the bokeh effect from the video.

In operation 920, the processor 120 may maintain provision of the bokeh effect on the basis of identification that the focused subject does not move out of the maximum distance. For example, the processor 120 may provide the bokeh effect as in operation 510, operation 520, or operation 525 of FIG. 5.

Although not illustrated in FIGS. 9A to 9B, the processor 120 may gradually increase the level of the bokeh effect on the basis of identification that the focused subject located out of the maximum distance enters the maximum distance.

As described above, when the focused subject moves out of the effective distance of the TOF camera, the electronic device 101 according to various embodiments may gradually remove the bokeh effect instead of removing the bokeh effect immediately. The electronic device 101 according to various embodiments may acquire a video having an enhanced quality bokeh effect through gradual removal thereof.

A method performed by an electronic device with a plurality of cameras according to various embodiments described above may include an operation of identifying a change in a distance between a focused subject and the electronic device from a first distance to a second distance within a first frame through at least some of the plurality of cameras while a video with a bokeh effect is acquired using the plurality of cameras, an operation of providing the bokeh effect of the video within a first background area identified on the basis of the second distance in a second frame subsequence to the first frame in response to identification that a difference between the first distance and the second distance is within a criterion range, and an operation of providing the bokeh effect of the video within a second background area identified on the basis of a third distance between the first distance and the second distance in the second frame in response to identification that the difference is out of the criterion range.

According to various embodiments, the method may further include an operation of providing the bokeh effect of the video within a third background identified on the basis of a fourth distance between the second distance and the third distance in a third frame subsequent to the second frame.

According to various embodiments, the method may further include an operation of providing the bokeh effect of the video in a third background area identified on the basis of the first distance in the second frame in response to identification that the difference is out of the criterion range and another criterion range.

According to various embodiments, the plurality of cameras may include an RGB camera and a depth camera including an emitter configured to emit an infrared light, and a receiver configured to receive a reflected light of the infrared light, and the operation of identifying the change in the distance from the first distance to the second distance within the first frame may include an operation of acquiring first data on a distance between each of a plurality of subjects including the focused subject in a Field of View (FOV) of the depth camera and the electronic device on the basis of the reflected light, an operation of acquiring third data refined from the first data using second data acquired through the RGB camera in response to identification that some of the plurality of subjects are out of a maximum distance from the electronic device that can be measured using the depth camera on the basis of some of the first data, and an operation of identifying that the distance between the focused subject and the electronic device is changed from the first distance to the second distance within the first frame on the basis of the third data.

According to various embodiments, the plurality of cameras may include an RGB camera and a depth camera including an emitter configured to emit an infrared light, and a receiver configured to receive a reflected light of the infrared light, and the operation of identifying the change in the distance from the first distance to the second distance within the first frame may include an operation of acquiring first data on a distance between each of a plurality of subjects including the focused subject in a Field of View (FOV) of the depth camera and the electronic device on the basis of the reflected light, an operation of acquiring third data refined from the first data using second data acquired through the RGB camera in response to identification that some of the plurality of subjects are out of a maximum distance from the electronic device that can be measured using the depth camera on the basis of some of the first data, and an operation of identifying that the distance between the focused subject and the electronic device is changed from the first distance to the second distance within the first frame on the basis of the third data.

According to various embodiments, the plurality of cameras may include an RGB camera and a depth camera including an emitter configured to emit an infrared light, and a receiver configured to receive a reflected light of the infrared light. The method may further include an operation of identifying the focused subject among a plurality of subjects in a Field of View (FOV) of the depth camera on the basis of a criterion having a highest priority among a plurality of criteria. A first criterion among the plurality of criteria may be to identify a subject designated by a touch input received through the display of the electronic device among the plurality of subjects as the focused subject. A second criterion among the plurality of criteria may be to identify a subject corresponding to a face among the plurality of subjects as the focused subject, A third criterion among the plurality of criteria may be to identify at least one subject included in an Auto Focus (AF) area among the plurality of subjects and identify a subject the closest to the electronic device among the plurality of subjects as the focused subject A priority of the first criterion may be higher than a priority of the second criterion and a priority of the third criterion, and the priority of the second criterion may be higher than the priority of the third criterion.

According to various embodiments, the plurality of cameras may include an RGB camera and a depth camera. The method may further include an operation of determining that the focused subject moves out of a maximum distance from the electronic device that is measurable using the depth camera through at least some of the plurality of cameras while the video with the bokeh effect is acquired using the plurality of cameras and an operation of gradually removing the bokeh effect from the video on the basis of the determination.

The method may further include an operation of identifying the third distance by adding a criterion distance to the first distance in response to identification that the difference is out of the criterion range, an operation of providing the bokeh effect of the video within the second background area identified on the basis of the third distance in the second frame, an operation of identifying the fourth distance by adding the criterion distance to the third distance, and an operation of providing the bokeh effect of the video within the third background area identified on the basis of the fourth distance in a third frame subsequent to the second frame.

A non-transitory computer-readable storage medium may store one or more programs including instructions configured to cause the an electronic device to, when executed by one or more processor of an electronic device with a plurality of cameras, identify a change in a distance between a focused subject and the electronic device from a first distance to a second distance within a first frame through at least some of the plurality of cameras while a video with a bokeh effect is acquired using the plurality of cameras, provide the bokeh effect of the video within a first background area identified on the basis of the second distance in a second frame subsequence to the first frame in response to identification that a difference between the first distance and the second distance is within a criterion range, and provide the bokeh effect of the video within a second background area identified on the basis of a third distance between the first distance and the second distance in the second frame in response to identification that the difference is out of the criterion range.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a plurality of cameras;
   a memory configured to store instructions; and
   at least one processor,
   wherein the at least one processor is configured to:
      identify a change in a distance between a focused subject and the electronic device from a first distance to a second distance within a first frame through at least some of the plurality of cameras while a video with a bokeh effect is acquired using the plurality of cameras,
      provide the bokeh effect of the video within a first background area identified based on the second distance in a second frame subsequence to the first frame in response to identifying that a difference between the first distance and the second distance is within a criterion range, and
      provide the bokeh effect of the video within a second background area identified based on a third distance between the first distance and the second distance in the second frame in response to identifying that the difference is out of the criterion range.

2. The electronic device of claim 1, wherein the at least one processor is further configured to: provide the bokeh effect of the video within a third background identified based on a fourth distance between the second distance and the third distance in a third frame subsequent to the second frame.

3. The electronic device of claim 1, wherein the at least one processor is further configured to: provide the bokeh effect of the video in a third background area identified based on the first distance in the second frame in response to identifying that the difference is out of the criterion range and another criterion range.

4. The electronic device of claim 1, wherein the plurality of cameras comprise a Red-Green-Blue (RGB) camera and a depth camera.

5. The electronic device of claim 4, wherein the depth camera comprises:
   an emitter configured to emit an infrared light, and
   a receiver configured to receive a reflected light of the infrared light.

6. The electronic device of claim 5, wherein the at least one processor is configured to:

acquire first data on a distance between each of a plurality of subjects including the focused subject in a Field of View (FOV) of the depth camera and the electronic device, based on the reflected light,
   acquire third data refined from the first data using second data acquired through the RGB camera in response to identifying that some of the plurality of subjects are out of a maximum distance from the electronic device that can be measured using the depth camera, based on some of the first data, and
   identify that the distance between the focused subject and the electronic device is changed from the first distance to the second distance within the first frame, based on the third data.

7. The electronic device of claim 6, wherein the at least one processor is configured to:
   acquire the third data refined from the first data by converting some of the first data to data corresponding to a distance between remaining parts of the focused subject and the electronic device, using the second data.

8. The electronic device of claim 4, further comprising a display,
   wherein the at least one processor is configured to identify the focused subject among a plurality of subjects in a Field of View (FOV) of the depth camera, based on a criterion having a highest priority among a plurality of criteria, wherein the plurality of criteria include:
      a first criterion to identify a subject designated by a touch input received through the display among the plurality of subjects as the focused subject,
      a second criterion to identify a subject corresponding to a face among the plurality of subjects as the focused subject, and
      a third criterion to identify at least one subject included in an Auto Focus (AF) area among the plurality of subjects and identify a subject closest to the electronic device among the at least one identified subject as the focused subject,
   wherein a priority of the first criterion is higher than a priority of the second criterion and a priority of the third criterion, and
   wherein the priority of the second criterion is higher than the priority of the third criterion.

9. The electronic device of claim 4, wherein the at least one processor is further configured to:
   determine that the focused subject moves out of a maximum distance from the electronic device that is measurable using the depth camera through at least some of the plurality of cameras while the video with the bokeh effect is acquired using the plurality of cameras, and
   gradually remove the bokeh effect from the video, based on the determination.

10. The electronic device of claim 1, wherein the at least one processor is configured to:
    identify the third distance by adding a criterion distance to the first distance in response to identifying that the difference is out of the criterion range,
    provide the bokeh effect of the video within the second background area identified based on the third distance in the second frame,
    identify a fourth distance by adding the criterion distance to the third distance, and
    provide the bokeh effect of the video within a third background area identified based on the fourth distance in a third frame subsequent to the second frame.

11. A method performed by an electronic device with a plurality of cameras, the method comprising:

identifying a change in a distance between a focused subject and the electronic device from a first distance to a second distance within a first frame through at least some of the plurality of cameras while a video with a bokeh effect is acquired using the plurality of cameras;

providing the bokeh effect of the video within a first background area identified based on the second distance in a second frame subsequence to the first frame in response to identifying that a difference between the first distance and the second distance is within a criterion range; and providing the bokeh effect of the video within a second background area identified based on a third distance between the first distance and the second distance in the second frame in response to identifying that the difference is out of the criterion range.

12. The method of claim 11, further comprising providing the bokeh effect of the video within a third background identified based on a fourth distance between the second distance and the third distance in a third frame subsequent to the second frame.

13. The method of claim 11, further comprising providing the bokeh effect of the video in a third background area identified based on the first distance in the second frame in response to identifying that the difference is out of the criterion range and another criterion range.

14. The method of claim 11, wherein:
the plurality of cameras comprises a Red-Green-Blue (RGB) camera and a depth camera, the depth camera includes an emitter for emitting an infrared light, and a receiver for receiving a reflected light of the infrared light, and
identifying the change in the distance from the first distance to the second distance within the first frame comprises:
acquiring first data on a distance between each of a plurality of subjects including the focused subject in a Field of View (FOV) of the depth camera and the electronic device, based on the reflected light,
acquiring third data refined from the first data using second data acquired through the RGB camera in response to identifying that some of the plurality of subjects are out of a maximum distance from the electronic device that can be measured using the depth camera, based on some of the first data, and
identifying that the distance between the focused subject and the electronic device is changed from the first distance to the second distance within the first frame, based on the third data.

15. The method of claim 11, wherein:
the plurality of cameras comprises a Red-Green-Blue (RGB) camera and a depth camera, the depth camera includes:
an emitter for emitting an infrared light, and
a receiver for receiving a reflected light of the infrared light,
the method further comprising identifying the focused subject among a plurality of subjects in a Field of View (FOV) of the depth camera, based on a criterion having a highest priority among a plurality of criteria, wherein the plurality of criteria include:
a first criterion to identify a subject designated by a touch input received through a display of the electronic device among the plurality of subjects as the focused subject,
a second criterion to identify a subject corresponding to a face among the plurality of subjects as the focused subject, and
a third criterion identify at least one subject included in an Auto Focus (AF) area among the plurality of subjects and identify a subject closest to the electronic device among the plurality of subjects as the focused subject,
a priority of the first criterion is higher than a priority of the second criterion and a priority of the third criterion, and
the priority of the second criterion is higher than the priority of the third criterion.

16. The method of claim 11, wherein the plurality of cameras comprise a Red-Green-Blue (RGB) camera and a depth camera, the method further comprising:
determining that the focused subject moves out of a maximum distance from the electronic device that is measurable using the depth camera through at least some of the plurality of cameras while the video with the bokeh effect is acquired using the plurality of cameras; and
gradually removing the bokeh effect from the video, based on the determination.

17. The method of claim 11, further comprising:
identifying the third distance by adding a criterion distance to the first distance in response to identifying that the difference is out of the criterion range;
providing the bokeh effect of the video within the second background area identified based on the third distance in the second frame;
identifying a fourth distance by adding the criterion distance to the third distance; and
providing the bokeh effect of the video within a third background area identified based on the fourth distance in a third frame subsequent to the second frame.

18. A non-transitory computer-readable storage medium for storing one or more programs comprising instructions, the instructions being configured to, when executed by one or more processor of an electronic device with a plurality of cameras, cause the electronic device to:
identify a change in a distance between a focused subject and the electronic device from a first distance to a second distance within a first frame through at least some of the plurality of cameras while a video with a bokeh effect is acquired using the plurality of cameras,
provide the bokeh effect of the video within a first background area identified based on the second distance in a second frame subsequence to the first frame in response to identifying that a difference between the first distance and the second distance is within a criterion range, and
provide the bokeh effect of the video within a second background area identified based on a third distance between the first distance and the second distance in the second frame in response to identifying that the difference is out of the criterion range.

19. The non-transitory computer-readable storage medium for storing one or more programs comprising instructions of claim 18, the instructions being further configured to cause the electronic device to, provide the bokeh effect of the video within a third background identified based on a fourth distance between the second distance and the third distance in a third frame subsequent to the second frame.

20. The non-transitory computer-readable storage medium for storing one or more programs comprising instructions of claim 18, the instructions being further configured to cause the electronic device to, provide the bokeh effect of the video in a third background area identified based on the first distance in the second frame in response to identifying that the difference is out of the criterion range and another criterion range.

\* \* \* \* \*